United States Patent
Herrmann

(10) Patent No.: US 9,492,891 B2
(45) Date of Patent: Nov. 15, 2016

(54) PARALLEL BELT SYSTEM FOR CUT SHEET TRANSPORT IN A LASER CUTTER

(71) Applicant: Xerox Corporation, Norwalk, CT (US)

(72) Inventor: Douglas K. Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 139 days.

(21) Appl. No.: 14/520,809

(22) Filed: Oct. 22, 2014

(65) Prior Publication Data

US 2016/0114426 A1 Apr. 28, 2016

(51) Int. Cl.
*B23K 26/08* (2014.01)
*B23K 26/38* (2014.01)
*B23K 26/40* (2014.01)

(52) U.S. Cl.
CPC ............ *B23K 26/0838* (2013.01); *B23K 26/38* (2013.01); *B23K 26/402* (2013.01); *B23K 2203/40* (2015.10)

(58) Field of Classification Search
CPC ................ B26D 1/465; B26D 7/0625; B26D 2007/0018; B23K 26/0838
USPC .......................................................... 83/155
See application file for complete search history.

(56) References Cited

U.S. PATENT DOCUMENTS

| 8,312,798 B2* | 11/2012 | Kwarta | B26D 1/185 |
| | | | 83/425.3 |
| 2010/0181165 A1* | 7/2010 | Finn | B23K 26/0838 |
| | | | 198/339.1 |
| 2012/0060662 A1* | 3/2012 | Hinshaw | B23D 45/048 |
| | | | 83/364 |

* cited by examiner

*Primary Examiner* — Patrick Mackey

(57) ABSTRACT

A parallel belt system for a laser cutter module and a method or non-transitory computer readable medium for transporting a cut sheet of media through a laser cutter in a printer is disclosed. For example, the parallel belt system includes a rotating shaft, a plurality of pairs of o-rings movably coupled to the rotating shaft, a plurality of belts for receiving a cut sheet of media, a guide for each one of the plurality of belts for holding a respective one of the plurality of belts rigid, a laser cutter for cutting a portion of the cut sheet of media and a collection module coupled below the plurality of belts for collecting the portion of the cut sheet of media that is cut by the laser cutter.

17 Claims, 5 Drawing Sheets

PARALLEL BELT SYSTEM FOR CUT SHEET TRANSPORT IN A LASER CUTTER

The present disclosure relates generally to improvements to transporting cut sheets in a laser cutter and, more particularly, to a parallel belt system for cut sheet transport in a laser cutter.

BACKGROUND

Currently, laser systems handling cut sheet media make use of stainless steel vacuum belts. However, stainless steel vacuum belts can experience problems when repeating the same die cut shapes, operating in high volumes or through cuts are needed.

One problem with the stainless steel vacuum belts is that the stainless steel vacuum belts require repeated cleaning. Even with repeated cleaning, the stainless steel vacuum belts can warp and clog resulting in the belt losing vacuum hold down, reducing reflectivity and ultimately causing unacceptable cut quality of the media.

When the vacuum is lost, the cut sheets may not be held in position to make accurate cuts. In addition, a small gap may form between the vacuum belt and the media causing the edges of the cut sheets to be browned or cause yellow edges. These defects in the cut sheets are unacceptable to customers.

In addition, the stainless steel vacuum belts may need to be regularly replaced even if they are regularly cleaned. At a cost of several hundred dollars per belt, changing the belt several times a month for each belt may become expensive.

SUMMARY

According to aspects illustrated herein, there are provided a parallel belt system for a laser cutter module and a method or non-transitory computer readable medium for transporting a cut sheet of media through a laser cutter in a printer. One disclosed feature of the embodiments is a parallel belt system for a laser cutter module comprising a rotating shaft, a plurality of belts for receiving a cut sheet of media, wherein each one of the plurality of belts rotates to move the cut sheet of media through the laser cutter module, wherein the plurality of belts is positioned parallel to one another, a guide for each one of the plurality of belts for holding a respective one of the plurality of belts rigid, a laser cutter for cutting a portion of the cut sheet of media and a collection module coupled below the plurality of belts for collecting the portion of the cut sheet of media that is cut by the laser cutter.

Another disclosed feature of the embodiments is a method that determines a location of each gutter of the cut sheet of media, aligns two or more belts to the location of each gutter of the cut sheet of media, wherein each one of the two or more belts is coupled to a rotating shaft and held rigid by a guide, receives the cut sheet of media by the two or more belts, cuts a portion of the cut sheet of media and collects the portion of the cut sheet of media below and between the two or more belts.

Another disclosed feature of the embodiments is a non-transitory computer-readable medium having stored thereon a plurality of instructions, the plurality of instructions including instructions which, when executed by a processor, cause the processor to perform operations that determines a location of each gutter of the cut sheet of media, aligns two or more belts to the location of each gutter of the cut sheet of media, wherein each one of the two or more belts is coupled to a rotating shaft and held rigid by a guide, receives the cut sheet of media by the two or more belts, cuts a portion of the cut sheet of media and collects the portion of the cut sheet of media below and between the two or more belts.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a parallel belt system for cut sheet transport in a laser cutter. As discussed above, current laser systems that handle cut sheet media use stainless steel vacuum belts. However, stainless steel vacuum belts require frequent maintenance, must be replaced regularly and cause defects, such as browning of the cut sheets or yellow edges.

Embodiments of the present disclosure provide a novel parallel belt system for cut sheet transport in a laser cutter that do not require the stainless steel vacuum belts. As a result, the cost associated with the maintenance and replacement of the steel vacuum belts is eliminated. In addition, the defects that can be caused by the stainless steel vacuum belts are avoided.

Figure 1:
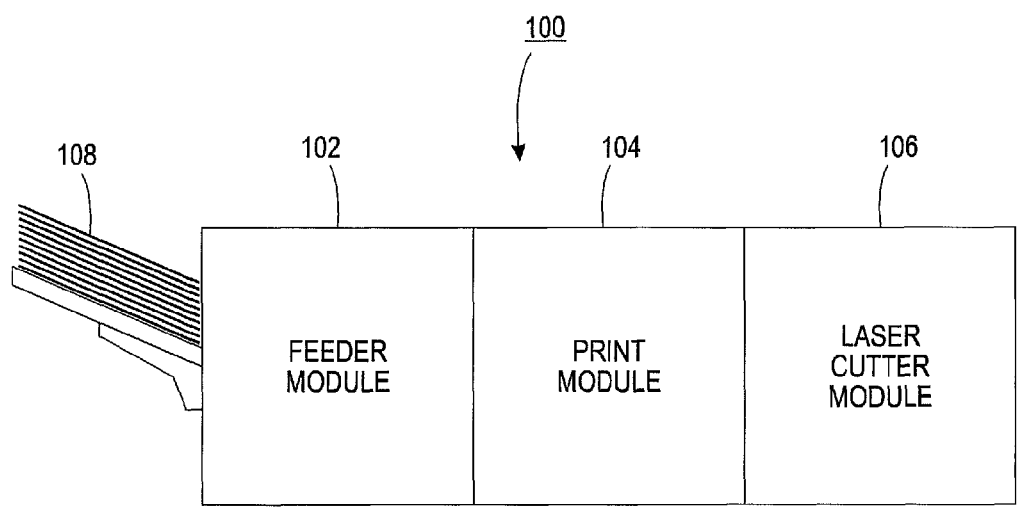
FIG. 1 illustrates a block diagram of a device of the present disclosure.

FIG. 1 illustrates an example device 100 of the present disclosure. In one embodiment, the device 100 may be a laser printer (e.g., a Xerox® iGen™ printer). In one embodiment, the device 100 may include a feeder module 102, a print module 104 and a laser cutter module 106. Although the feeder module 102, the print module 104 and the laser cutter module 106 are illustrated in the device 100, it should be noted that the device 100 may include other modules. For example, other modules may include a stacker module, a finishing module, an output module, and the like.

In one embodiment, the feeder module 102 may feed individual cut sheets of media 108 to the print module 104. In one embodiment, the cut sheet of media 108 may be paper, card stock, or other types of print media. In one embodiment, the cut sheets of media 108 are separate or independent pieces of cut sheets. In other words, the cut sheets of media 108 are not a continuous web (e.g., large rolls of continuous paper) as used by some printing devices.

In one embodiment, the print module 104 may print patterns or images onto each one of the cut sheets of media 108 that are fed from the feeder module 102. The print module 104 may print images onto a cut sheet of media 108 in multiple columns with a gutter on each edge of the cut sheet of media 108 and in between each column of images that are printed.

In one embodiment, the laser cutter module 106 may receive the cut sheet of media 108 from the print module 104 and cut each image that is printed onto the cut sheet of media 108 via a laser cutter inside the laser cutting module 106. The embodiments of the parallel belt system disclosed in the present disclosure are located within the laser cutter module 106.

Although the laser cutter module 106 is illustrated as being after the print module 104, it should be noted that the modules may be in any order. For example, in some applications or devices 100 the laser cutter module 106 could come before the print module 104.

Figure 2:
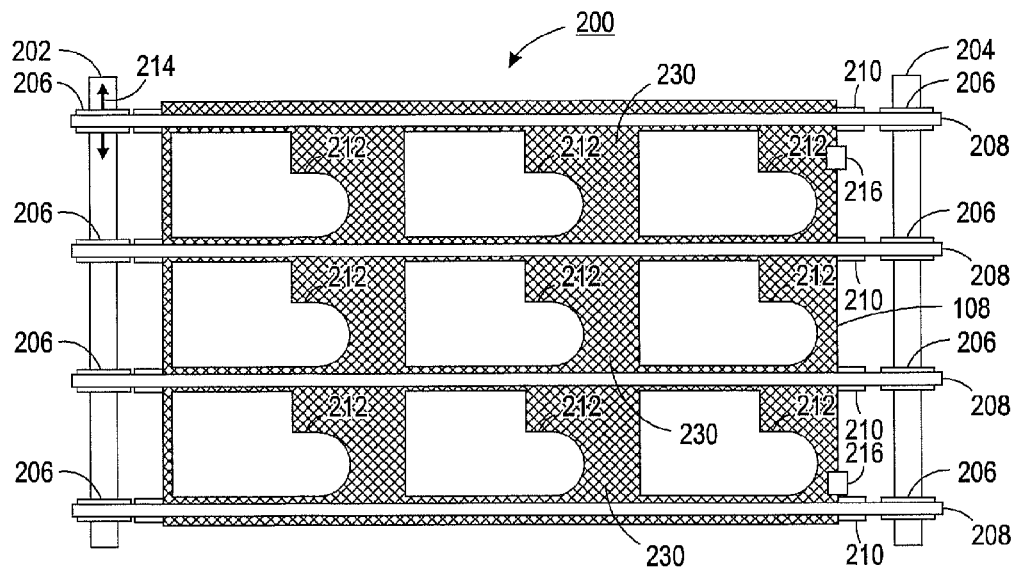
FIG. 2 illustrates a top view of a first embodiment of a parallel belt system of the present disclosure.

FIG. 2 illustrates a top view of one embodiment of the parallel belt system 200 that resides within the laser cutter module 106. As discussed above, previous devices used a stainless steel vacuum belt to move the cut sheets through the laser cutter module 106. However, the stainless steel vacuum belts required frequent maintenance and replacement thereby leading to high operating costs.

The parallel belt system 200 of the present disclosure removes the need for the stainless steel vacuum belt and does not use any physical support directly beneath portions 212 of the cut sheet media 108 that are cut by the laser cutter module 106.

In one embodiment, the parallel belt system 200 comprises two or more belts 208. In one embodiment, the belts 208 may be made from a rubber or urethane material. In one embodiment, the belts 208 may be an o-ring shaped belt. However it should be noted that any shaped belt may be used. In one embodiment, each one of the belts 208 may be aligned parallel to one another. In one embodiment, the belts 208 may be coupled to a shaft 202 and a shaft 204. The belts 208 may be supported and kept rigid by a respective guide 210.

In one embodiment, the number of belts 208 that is used may be a function of a number of columns that is used in the cut sheet of media 108. For example, if only a single column is used, then only two belts 208 are needed, if two columns are used then three belts 208 are needed, if three columns are used then four belts 208 are needed, and so forth.

In one embodiment, the cut sheet of media 108 is aligned in the parallel belt system 200 such that the belts 208 are located in one or more gutters 230 of the cut sheet of media 108. In other words, the gutters 230 are the spaces between the portions 212 that are printed on the cut sheet of media 108.

In one embodiment, a width of the belts 208 and the guides 210 are relatively narrow. In one embodiment, the width of the belts 208 and the guides 210 may be narrower than a width of the gutters 230 of the cut sheet of media 108. Thus, when the portions 212 are cut out of the cut sheet of media 108, the portions 212 may be allowed to freely fall into a collection module 250, as discussed below.

In one embodiment, as the cut sheet of media 108 moves from left to right on the page of FIG. 2, the laser cutter module 106 may cut the portions 212 out of the cut sheet of media 108. The belts 208 may roll via the shafts 202 and 204 and the belts 208 may catch and move the cut sheet of media 108.

Notably, no support is used under the cut sheet of media 108. In addition, the cut sheet of media 108 is not a continuous web. Thus, each individual cut sheet of media 108 is held taut by the belts 208 such that the laser cutter module 106 may accurately cut the portions 212. In other words, the parallel belt system 200 continuously receives individual cut sheets of media 108 one after another that are not connected as a continuous web would be.

In addition, since there is no small air gap to be formed between the cut sheet of media 108 and any support directly beneath the cut sheet of media 108 (e.g., the previously used stainless steel vacuum belts), the defects caused by the air gaps are avoided. Specifically, the edges of the portions 212 that are cut are not browned and yellow edges are avoided.

Figure 3:
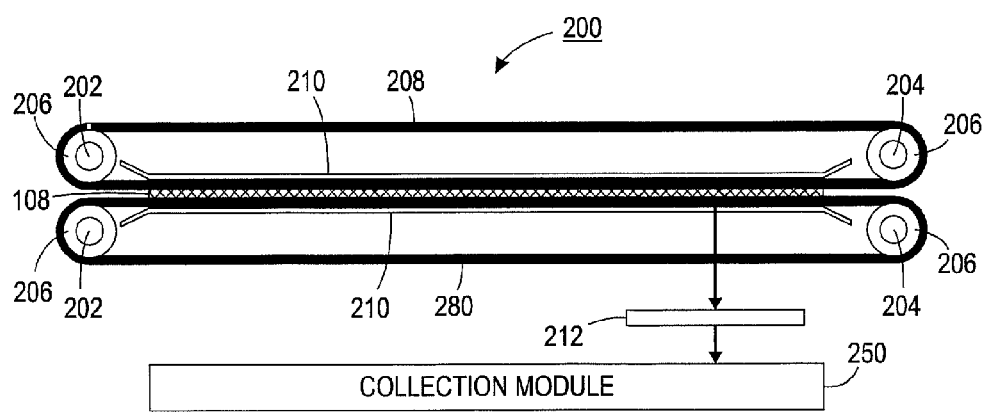
FIG. 3 illustrates a side view of the first embodiment of the parallel belt system of the present disclosure.

FIG. 3 illustrates a side view of the parallel belt system 200. In one embodiment, the parallel belt system 200 may include a top belt 208 and a bottom belt 280 for each gutter 230 of the cut sheet of media 108. For example, in the top view of FIG. 2, each one of the four top belts 208 would also have a corresponding bottom belt 280 below the cut sheet of media 108.

In one embodiment, cut sheet of media 108 may be fed between the top belt 208 and the bottom belt 280. As the portions 212 are cut by the laser cutter module 106, the portions 212 may be collected by a collection module 250 below the cut sheet of media 108. In one embodiment, the collection module 250 may be a moving collection module (e.g., a full width moving belt system) or a stationary collection module (e.g., a basket or collector where the cut portions 212 are removed when the collector is full).

In one embodiment, the portions 212 that are cut are collected below and between the top belts 208 or between the bottom belts 280. Notably, this is possible by the parallel belt system 200 of the present disclosure because no stainless steel vacuum belt is used to support and move the entire cut sheet of media. Rather, the parallel belt system 200 of the present disclosure uses the belts 208 in the gutters 230 of the cut sheet of media 108 leaving the cut sheet of media unsupported directly below the portions 212 that are cut.

Referring back to FIG. 2, in one embodiment, belts 208 may be moved in an in-board direction and an out-board direction along a line 214. In one embodiment, the in-board direction may be a direction towards a top of the page and an out-board direction may be a direction towards a bottom of the page.

As a result, the number of columns and the positioning of the gutters 230 on the cut sheet of media 108 may be changed from sheet to sheet. Accordingly, the number of belts 208 that are used or the positioning of the belts 208 may be adjusted on the fly as the cut sheets of media 108 are continuously fed to the laser cutter module 106.

For example, a first cut sheet of media 108 may have three columns as shown in FIG. 2. Thus, the first cut sheet of media 108 may require all four belts 208. A second cut sheet of media 108 that is received after the first cut sheet of media 108 may have two columns. Thus, one of the belts 208 may be moved along an in-board direction and out of the way. The next two belts 208 may be moved along an in-board direction to align with the three gutters 230 of the two columns of the second cut sheet of media 108.

In one embodiment, an optional pair of o-rings 206 may be used to couple the belts 208 to the shafts 202 and 204. As a result, the o-rings 206 may be moved automatically by a processor or controller within the device 100 based on a number of columns and a position of the gutters 230 of the cut sheet of media 108. For example, the layout of the printed images and the positioning of the gutters 230 may be received by the processor from the print module 104 or from a printed mark (e.g., a bar code) upstream of the laser cutter module. The processor in the laser cutter module 106 may then adjust the o-rings 206 accordingly to properly position the necessary number of belts 208 and/or 280 relative to the position of the gutters 230 in the cut sheet of media 108.

In one embodiment, the o-rings 206 may be moved mechanically. For example, the shafts 202 and 204 may be threaded (e.g., a screw shaft) and the o-rings may have matching threads that can be moved as the o-rings are rotated around the threaded shafts 202 and 204. In another embodiment, the o-rings may be moved electronically or magnetically.

In one embodiment, one or more clamps 216 may be used in addition to the belts 208 for moving the cut sheet of media 108 through the laser cutter module 106. In one embodiment, the one or more clamps 216 may be clamped onto a lead edge of the cut sheet of media 108.

Figure 4:
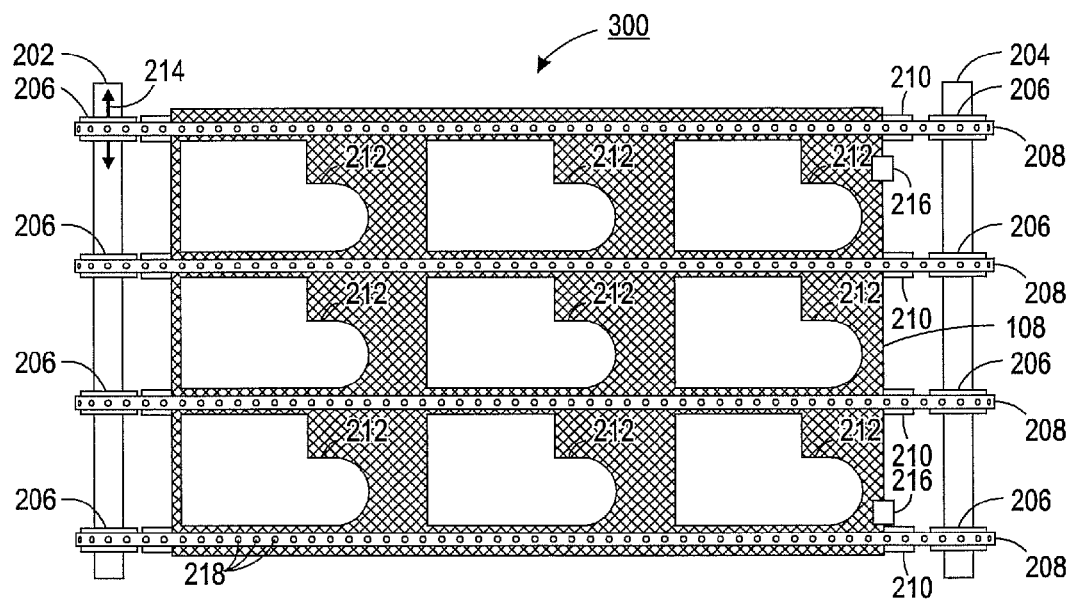
FIG. 4 illustrates top view of a second embodiment of the a parallel belt system of the present disclosure.

FIG. 4 illustrates a top view another embodiment of the parallel belt system 300. The parallel belt system 300 is similar to the parallel belt system 200 illustrated in FIG. 2 in many respects and identical items are labeled with the same reference numeral. For example, the parallel belt system 300 also includes belts 208. Each belt 208 is coupled to shafts 202 and 204 such that the belts 208 may be moved along a line 214 in an in-board direction or an out-board direction. In addition, the parallel belt system 300 may use optional o-rings 206 to allow the belts to be moved automatically along the line 214 in the in-board direction or the out-board direction. The parallel belt system 300 may also use one or more clamps 216 on a lead edge of the cut sheet of media 108.

One difference in the parallel belt system 300 from the parallel belt system 200 is that the belts 208 include one or more openings 218. The one or more openings 218 allow a vacuum to be used to draw the cut sheet of media 108 to the belt 208.

Figure 5:
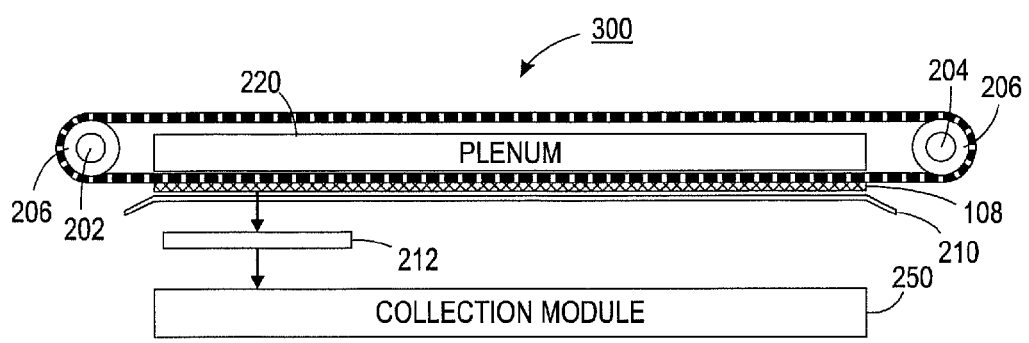
FIG. 5 illustrates a side view of the second embodiment of the parallel belt system of the present disclosure.

FIG. 5 illustrates a side view of the parallel belt system 300. Another difference of the parallel belt system 300 from the parallel belt system 200 is that the parallel belt system 300 uses a vacuum plenum 220. Notably, the parallel belt system 300 does not use the bottom belts 280 of the parallel belt system 200.

In one embodiment, vacuum plenum 220 may create vacuum through the one or more holes 218 to hold the cut sheet of media 108 to a top belt 208 and above the guide 210. As the cut sheet of media 108 is moved through the laser cutter module 106 and the portions 212 are cut, the cut portions 212 are collected by the collection module 250.

As a result, embodiments of the present disclosure provide an improved laser cutter module 106. For example, the need for stainless steel vacuum belts that required frequent maintenance and replacement leading to a high cost of operation are eliminated. In addition, the defects associated with using a stainless steel vacuum belt (e.g., browning and yellow edges) are eliminated by the parallel belt system of present disclosure.

Figure 6:
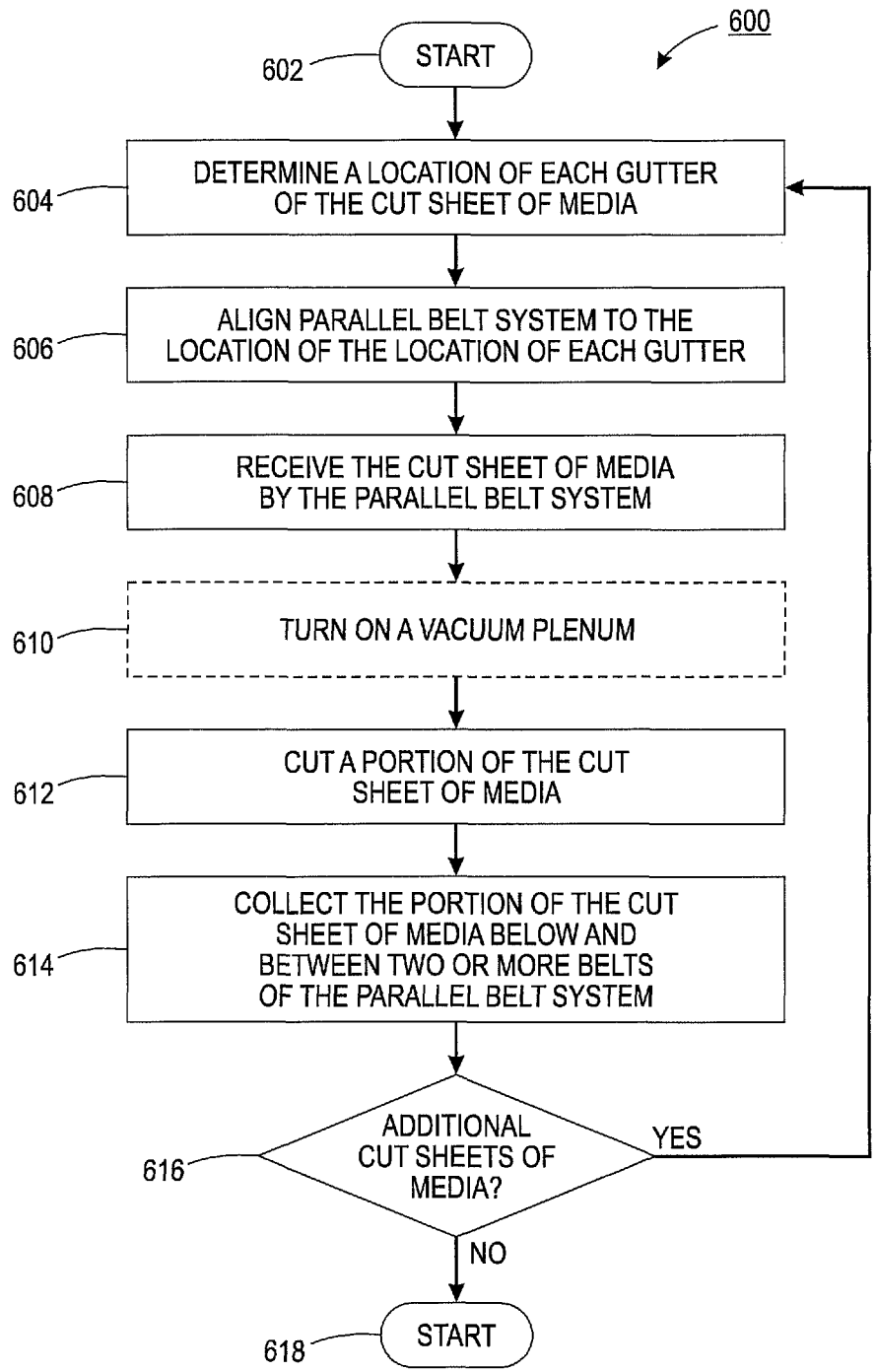
FIG. 6 illustrates an example flowchart of one embodiment of a method for transporting a cut sheet through a laser cutter in a printer.

FIG. 6 illustrates a flowchart of a method 600 for transporting a cut sheet through a laser cutter in a printer. In one embodiment, one or more steps or operations of the method 600 may be performed by the device 100 or a general-purpose computer as illustrated in FIG. 6 and discussed below.

At step 602 the method 600 begins. At step 604, the method 600 determines a location of each gutter of the cut sheet of media. In one embodiment, a processor or controller of the device or printer may determine how many columns are used for the cut sheet of media that are fed and gutter locations for each column. In one embodiment, the number of columns and the gutter locations may be based on a printed mark (e.g., a barcode) that is read upstream of the laser cutter module 106. In one embodiment, the number of columns and the gutter locations may be based on input received from a user or based on information passed along from a printing module to the laser cutter module.

At step 606, the method 600 aligns the parallel belt system to the location of the location of each gutter. In one embodiment, the parallel belt system may comprise two or more belts where each belt is movably coupled to a rotating shaft. The belts may be held rigid by a guide. The belts may be moved in an in-board direction or an out-board direction along a length of the rotating shaft.

In one embodiment, the belts may be coupled to optional o-rings, which are then movably coupled to the rotating shaft. The o-rings may be moved automatically via mechanical, electronic or magnetic means along an in-board direction or an out-board direction.

In one embodiment, the number of belts that are used may be a function of a number of columns that are used in the cut sheet of media. For example, if there are four belts used in parallel belt system and three columns are printed on the cut sheet of media, then all four belts may be used. In another example, if only two columns are printed on the cut sheet of media, then one of the belts may be moved out of the way and the remaining three belts may be moved and aligned with three gutters associated with the two columns on the cut sheet of media.

At step 608, the method 600 receives the cut sheet of media by the parallel belt system. For example, after a printer module prints the desired image on to the cut sheet of media, then the cut sheet of media may be fed to the parallel belt system of a laser cutter module.

In one embodiment, the cut sheet of media may be received between a top belt and bottom belt for each gutter of the cut sheet of media as illustrated in FIG. 3. In another embodiment, the cut sheet of media may be received by a belt having one or more holes that uses a vacuum plenum to hold the cut sheet of media as illustrated in FIG. 5.

At optional step 610, the method 600 turns on a vacuum plenum. For example, if the parallel belt system uses a vacuum plenum, then the vacuum plenum may be turned on to create a vacuum through the one or more openings on the belts to hold and move the cut sheet of media through the parallel belt system.

At step 612, the method 600 cuts a portion of the cut sheet of media. For example, a laser cutter module may cut each portion of the cut sheet of media that is to be cut. The laser cutter module may make accurate cuts without creating defects (e.g., browning or yellow edges) using the parallel belt system of the present disclosure.

At step 614, the method 600 collects the portion of the cut sheet of media below and between two or more belts of the parallel belt system. In one embodiment, a collection module may be located below the parallel belt system. Since the embodiments of the present disclosure do not use a stainless steel vacuum belt that provides support directly below the portions of the cut sheet of media that are cut, the portions that are cut may fall below and between the two or more belts. In other words, the portions that are cut from the cut sheet of media are not directly supported, the cut portions may fall below and between the two or more belts.

At step 616, the method 600 determines if there are additional cut sheets of media. If there are additional cut sheets of media that need to be fed through the parallel belt system, then the method 600 returns to step 604 or alternatively to step 608. Then the steps 604-616 or 608-616 may be repeated. If there are no more additional cut sheets of media that need to be fed through the parallel belt system, then the method 600 may proceed to step 618. At step 618, the method ends.

It should be noted that although not explicitly specified, one or more steps, functions, or operations of the method 600 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 6 that recite a determining operation, or involve a decision, do not necessarily require that both branches of the determining operation be practiced. In other words, one of the branches of the determining operation can be deemed as an optional step.

Figure 7:
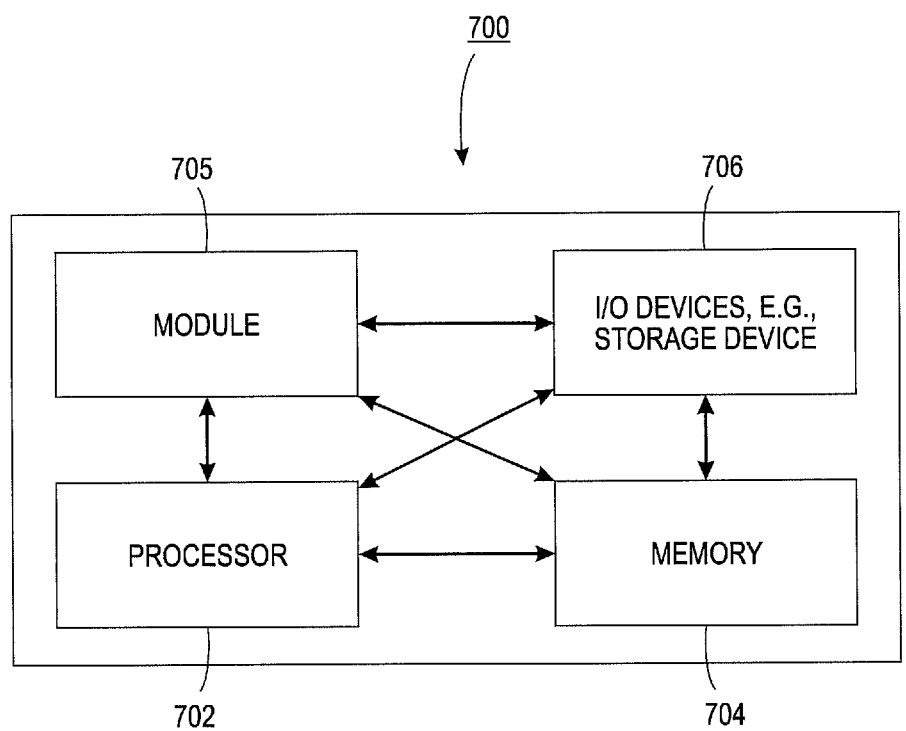
FIG. 7 illustrates a high-level block diagram of a general-purpose computer suitable for use in performing the functions described herein.

FIG. 7 depicts a high-level block diagram of a general-purpose computer suitable for use in performing the functions described herein. As depicted in FIG. 7, the system 700 comprises one or more hardware processor elements 702 (e.g., a central processing unit (CPU), a microprocessor, or a multi-core processor), a memory 704, e.g., random access memory (RAM) and/or read only memory (ROM), a module 705 for transporting a cut sheet through a laser cutter in a printer, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 705 for transporting a cut sheet through a laser cutter in a printer (e.g., a software program comprising computer-executable instructions) can be loaded into memory 704 and executed by hardware processor element 702 to implement the steps, functions or operations as discussed above in connection with the exemplary method 600. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for transporting a cut sheet through a laser cutter in a printer (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A parallel belt system for a laser cutter module, comprising:
   a rotating shaft;
   a plurality of belts coupled to the rotating shaft for receiving a cut sheet of media, wherein each one of the plurality of belts rotates to move the cut sheet of media through the laser cutter module, wherein the plurality of belts is positioned parallel to one another;
   a guide for each one of the plurality of belts for holding a respective one of the plurality of belts rigid;
   a laser cutter for cutting a portion of the cut sheet of media;
   a collection module coupled below the plurality of belts for collecting the portion of the cut sheet of media that is cut by the laser cutter; and
   a vacuum plenum coupled to one of the plurality of belts, wherein the one of the plurality of belts comprises a plurality of openings to allow the vacuum plenum to hold the cut sheet of media against the one of the plurality of belts.

2. The parallel belt system of claim 1, wherein the cut sheet of media is fed between the plurality of belts and the guide.

3. The parallel belt system of claim 1, wherein the plurality of belts comprises a top belt and a bottom belt for each gutter of the cut sheet of media and the cut sheet of media is fed between the top belt and the bottom belt.

4. The parallel belt system of claim 1, wherein each one of the plurality of belts is movable in an in-board direction or an out-board direction based on a gutter position of the cut sheet of media.

5. The parallel belt system of claim 1, further comprising:
   one or more pairs of o-rings, wherein each one of the plurality of belts is coupled to a respective pair of the one or more pairs of o-rings, wherein the one or more pairs of o-rings are moved automatically via a mechanical means or an electrical means.

6. The parallel belt system of claim 1, wherein a number of the plurality of belts is a function of a number of columns used in the cut sheet of media.

7. The parallel belt system of claim 1, wherein the collection module comprises a stationary module.

8. The parallel belt system of claim 1, wherein the collection module comprises a moving belt.

9. The parallel belt system of claim 1, wherein the laser cutter module is in a laser printer.

10. A method for transporting a cut sheet of media through a laser cutter in a printer, comprising:
    determining a location of each gutter of the cut sheet of media;
    aligning two or more belts to the location of each gutter of the cut sheet of media, wherein each one of the two or more belts is coupled to a rotating shaft and held rigid by a guide;
    receiving the cut sheet of media by the two or more belts;
    cutting a portion of the cut sheet of media;
    collecting the portion of the cut sheet of media below and between the two or more belts; and
    turning on a vacuum plenum to create a vacuum between the cut sheet of media and one or more openings on each one of the two or more belts.

11. The method of claim 10, wherein the two or more belts comprise a top belt and a bottom belt associated with the each gutter, wherein the receiving comprises receiving the cut sheet of media between the top belt and the bottom belt associated with the each gutter.

12. The method of claim 10, wherein the aligning comprises moving one or more of the two or more belts in an in-board direction or an out-board direction.

13. The method of claim 10, wherein the aligning comprises moving a pair of o-rings that are coupled to each one of the two or more belts automatically via a mechanical means or an electrical means.

14. The method of claim 10, wherein the determining is performed by a processor of the printer.

15. The method of claim 10, wherein the collecting is performed via a moving belt or a stationary module.

16. The method of claim 10, wherein the determining, the aligning, the receiving, the cutting and the collecting are repeated continuously for consecutively fed cut sheets of media.

17. A non-transitory computer-readable medium storing a plurality of instructions which, when executed by a processor, cause the processor to perform operations for transporting a cut sheet of media through a laser cutter in a printer, the operations comprising:
    determining a location of each gutter of the cut sheet of media;
    aligning two or more belts to the location of each gutter of the cut sheet of media, wherein each one of the two or more belts is coupled to a rotating shaft and held rigid by a guide;
    receiving the cut sheet of media by the two or more belts;
    cutting a portion of the cut sheet of media;
    collecting the portion of the cut sheet of media below and between the two or more belts; and
    turning on a vacuum plenum to create a vacuum between the cut sheet of media and one or more openings on each one of the two or more belts.

* * * * *